May 23, 1933.   R. W. EGAN ET AL   1,910,096
ENDLESS CHAIN CONVEYER
Filed Aug. 10, 1931   3 Sheets-Sheet 2
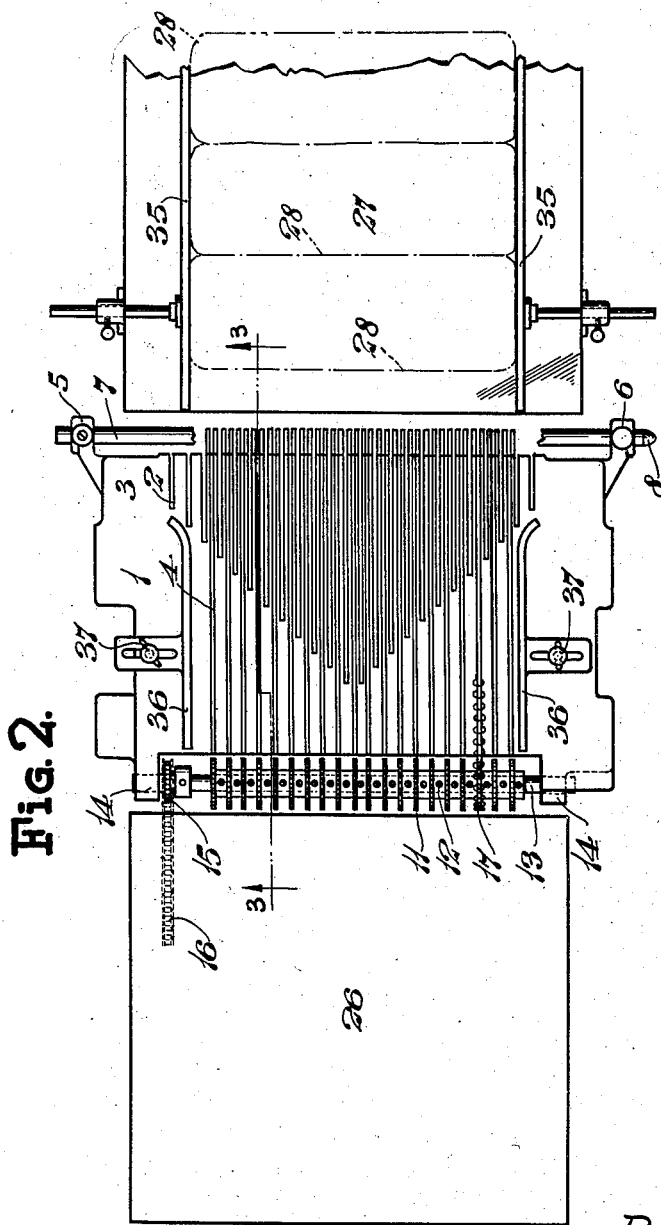
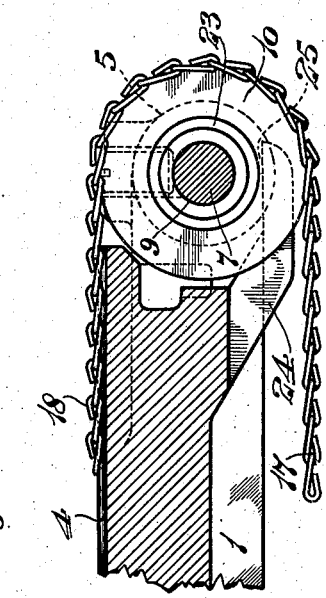
RAYMOND W. EGAN
CHARLES H. PETSKEYES
INVENTORS
BY
ATTORNEY.

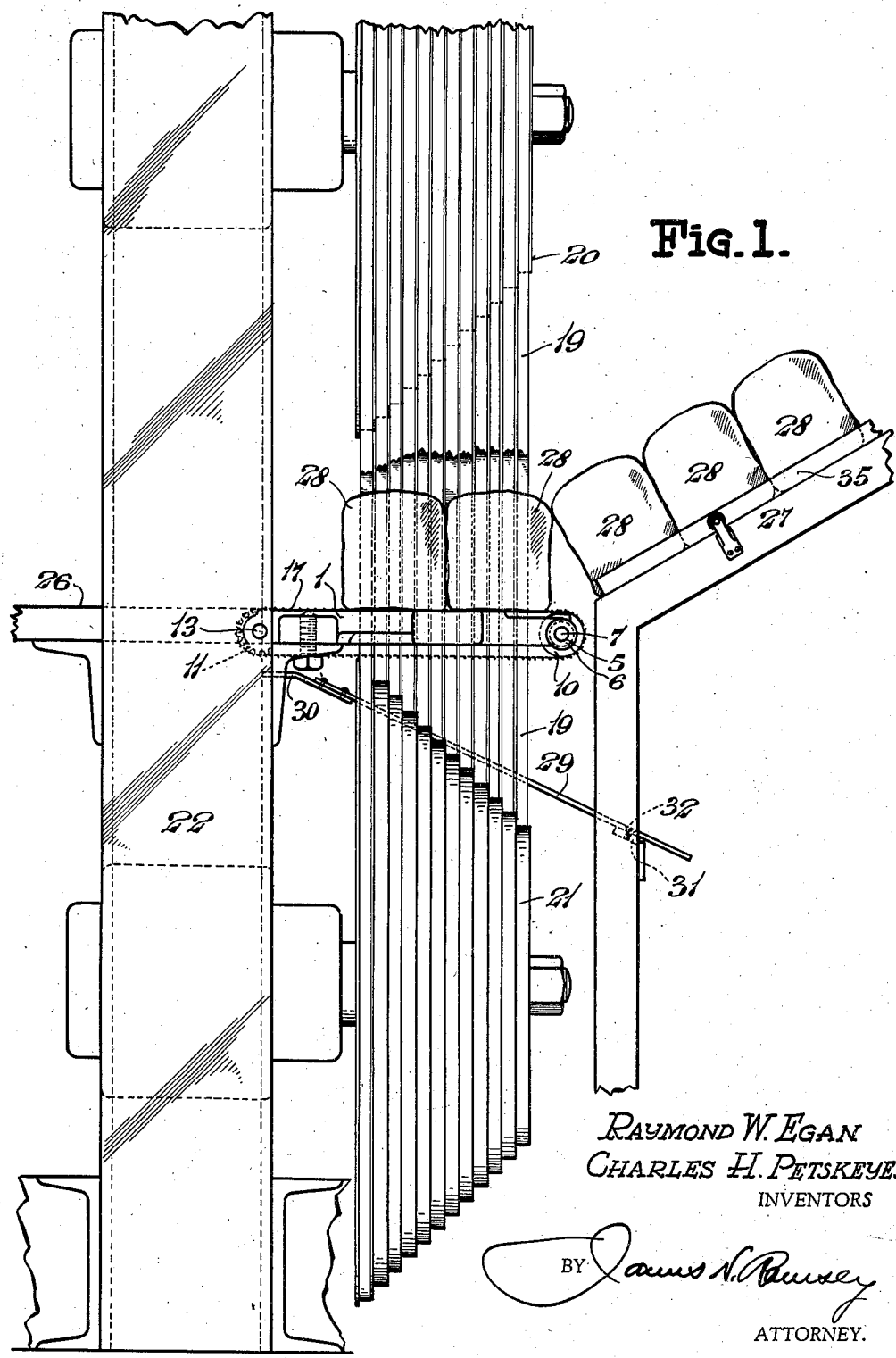

May 23, 1933.  R. W. EGAN ET AL  1,910,096
ENDLESS CHAIN CONVEYER
Filed Aug. 10, 1931   3 Sheets-Sheet 3
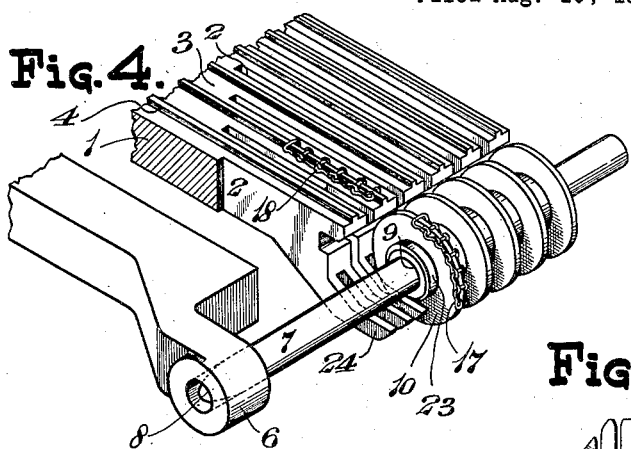
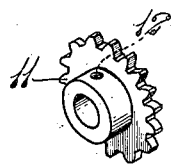
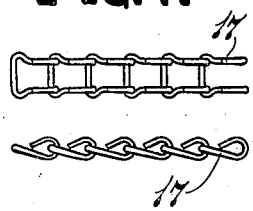
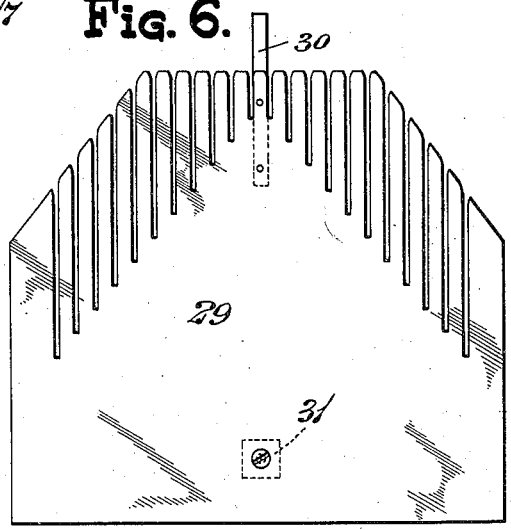
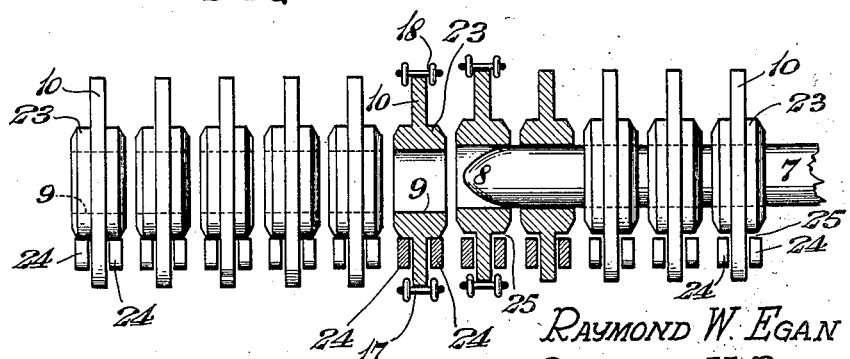
RAYMOND W. EGAN
CHARLES H. PETSKEYES.
INVENTORS
BY
ATTORNEY.

Patented May 23, 1933

1,910,096

UNITED STATES PATENT OFFICE

RAYMOND W. EGAN AND CHARLES H. PETSKEYES, OF CINCINNATI, OHIO, ASSIGNORS TO THE J. A. FAY & EGAN COMPANY, OF CINCINNATI, OHIO, A CORPORATION OF OHIO

ENDLESS CHAIN CONVEYER

Application filed August 10, 1931. Serial No. 556,184.

This invention relates to endless chain conveyers and more particularly to a conveyer adaptable for use in feeding loaves of bread into, through and past the endless blades of a bread slicing machine.

The primary object of our invention is to provide a conveyer of the above referred to character, the construction of which permits of inserting and removing the endless blades of a bread slicing machine.

Another object of our invention is to provide means whereby the chains of the conveyer are guided in their passage between the blades so as not to interfere therewith, which would result in breakage of the chain or blades or in dulling the blades.

A further object of our invention is to provide an endless chain conveyer for feeding bread loaves towards, through and past the blades of a bread slicing machine without the necessity of having any other means to push the loaves into, through and past the knives.

A still further object of our invention is to utilize the motion of the lower run of the endless conveyer chains to automatically clear away any hard formation of crumbs which may build up upon the crumb board or tray.

Our invention consists in providing a table having chain tracks integrally formed therewith and having one end provided with a plurality of slots to receive the endless blades of a bread slicing machine, of a plurality of driven sprockets rotatably mounted at one end of the table, of a plurality of idler sprockets mounted at the other end of said table, of a plurality of conveyer chains trained over said sprockets and having the upper course guided across said table by said track, of means for normally supporting said idler wheels and of auxiliary means for supporting said idler wheels during the insertion or removal of the endless cutting blades.

Our invention further consists in the construction, combination, location and arrangement of parts, all as will be hereinafter more fully set forth and finally claimed.

In the accompanying drawings, forming a material part of this disclosure—

Fig. 1 is a fragmentary side elevational view of a multiple endless blade bread slicing machine equipped with the bread feeding conveyer embodying the principles of the present invention;

Fig. 2 is a plan view of the conveyer parts broken away and omitted and shown connection with the infeed and outfeed tables;

Fig. 3 is a vertical longitudinal section through the conveyer on an enlarged scale, partly broken away and taken on a plane corresponding to line 3—3 of Fig. 2;

Fig. 4 is an isometric view of a corner portion of the conveyer table showing a view of the idler wheels and a small portion of one of the conveyer chains to clearly illustrate the invention;

Fig. 5 is an isometric detail view of one of the driving sprockets for the conveyer chain;

Fig. 6 is an elevational view of the crumb board or tray;

Fig. 7 is a front and side elevation of a small portion of the conveyer chain; and Fig. 8 is an end elevation of a number of idler wheels three of which are illustrated in cross section and two of which show their respective conveyer chains, the figure illustrating the manner in which the wheels are supported normally and during the time when the blades are inserted or removed in their respective slots in the table.

In the embodiment of our invention as illustrated and which shows a preferred construction, we provide an endless chain bread conveyer for multiple endless blade bread slicing machines comprising a table 1 having a plurality of blade receiving slots 2 cut in the end 3 and of graduated lateral depths, as shown in Fig. 2, and a plurality of chain tracks or guides 4 formed integral with said table and extending the length of said table and positioned between said slots. 5 and 6 designate bearing bosses formed integral with the table 1 and adapted to support the idler wheel shaft 7. One end of this shaft 7 is rounded or tapered at 8 so as to be readily inserted within the bore 9 of the idler wheels 10, for reasons presently to be described. 11 designates the driven sprockets each of which is provided with a set screw 12 whereby it can be fixed to the driven sprocket shaft 13, the latter being suitably journaled within the arms 14—14 of table 1, as clearly shown in Fig. 2. 15 represents a driving sprocket which is also fixed to the driving sprocket shaft 13 and driven from any suitable source of power by means of the chain 16. 17 designates endless conveyer chains, which chains, as shown in Fig. 3, are trained over the idler wheels 10 and the driven sprockets 11, the upper course 18 being guided across the table 1 by the chain tracks 4.

Referring to Fig. 1, the endless cutting blades 19 are trained over step wheels 20 and 21, which wheels are suitably driven and rotatably supported by the frame 22. The endless cutting blades 19, therefore, are received within the slots 2 in table 1 and the chains 17 passed between the blades.

In order to insert the endless blades 19 within the slots 2, or remove them therefrom, it will be readily apparent that the shaft 7 must be withdrawn from the bore 9 of the idler wheels 10, as shown in Fig. 8. When the shaft 7 is withdrawn from the bore 9 of the idler wheels 10, the hubs 23 of said idler wheels are supported by the fingers 24 formed integral with the lower side of table 1. There are two of these fingers 24 for each of the wheels 10 and they are so positioned upon the hubs 23 that during normal operation or when the shaft 7 is inserted through the bore 9 of the wheels 10 to rotatably support said wheels, a slight clearance 25 (Fig. 3) is maintained between the hubs 23 and the fingers 24. 26 designates the outfeed table and 27 designates the infeed table, the latter table being at an angle relative to the conveyer chains 17 (as shown in Fig. 1) to feed the bread loaves 28 by gravity until they are picked up by said conveyer chains 17. 29 designates a crumb board or tray which is suitably mounted at an angle beneath the conveyer table and removably supported by the tongue 30, resting upon the frame 22 and the block 31 fixed to the underside of the tray 29 by screw 32. 35 designates ordinary guides for guiding the bread loaves 28 downwardly upon the infeed table 27, and 36 designates similar adjustable guides, the latter guides being adjustably fixed upon the top of table 1 by hand screws or wing nuts 37.

In operation our improved endless chain conveyer for multiple endless blade slicing machine operates in the following manner:

As the loaves of bread 28 slide downward upon the infeed table 27, they are deposited upon the upper run or course 18 of the endless conveyer chains 17 and passed into the endless cutting blades 19, which blades divide the loaves into an equal number of slices. As the blades 19 travel downwardly through the loaves of bread 28 the loaves are frictionally held or pressed against the upper run 18 of the conveyer chains 17 and as the chains are continually moving so as to carry the bread loaves 28 forward, it is unnecessary to have any other means for feeding the loaves through the cutting blades as the downward pressure of the latter, in combination with the forward movement of the conveyer chains, produces the right amount of friction to hold the loaves firmly upon the conveyer chains during the cutting operation.

We are aware of the fact that many chain conveyers have heretofore been utilized for conveying various articles, but to the best of our knowledge we are the first to utilize a chain conveyer for passing loaves of bread through endless cutting blades of bread slicing machines. In this type of machine it is not only necessary that the chains pass between the cutting blades but a still more necessary feature is found in the removable shaft 7 for supporting the idler wheels 10 and in the fingers 24 adaptable for supporting the hubs of the idler wheels during the removal of said shaft. In other words, to provide an endless chain conveyer for a multiple blade bread slicing machine it is necessary to provide some means wherein the chains are supported so that the endless cutting blades can be inserted and removed when necessary.

While we have shown one particular embodiment of our invention, it is to be understood that various changes and modifications can be made without departing from the scope or spirit thereof, the invention being limited only by the claims.

Having thus described our invention, what we claim as new and desire to secure by Letters Patent is:

1. A chain conveyer for bread slicing machines comprising the combination of a table having a plurality of blade receiving slots cut therein to receive the endless cutting blades of said slicing machine, a plurality of driven sprockets rotatably mounted at one end of said table, means for driving said sprockets, a plurality of idler wheels located at the other end of said table, a plurality of conveyer chains trained over said sprockets and wheels, respectively, in such a manner that the upper stretch of said chains pass across the top of said table and the lower stretch of said chains pass beneath said table, a plurality of chain tracks formed integral with the top of said table and positioned between said blade receiving slots, hubs on said idler wheels, supporting fingers formed integral with said table, and a removable shaft for normally supporting said idler wheels characterized by the fact that when it is removed to allow insertion or removal of the endless cutting blade said idler wheels are supported by their hubs resting on said supporting fingers, substantially as set forth and for the purposes specified.

2. In a bread slicing machine, a table having blade receiving slots, endless cutting blades mounted to operate vertically through said slots, a plurality of driven sprockets rotatably mounted at one end of said table, means for driving said sprockets, a plurality of idler wheels rotatably supported at the other end of said table, a plurality of endless conveyer chains trained over said sprockets and wheels, respectively, and driven by said sprockets, means for guiding the upper stretch of said chains across the top of said table, characterized by the fact that the means for rotatably supporting said idler wheels comprises a shaft supported by said table and passing through said idler wheels and a plurality of spaced apart fingers carried by said table and disposed beneath the hubs of said wheels whereby during normal operation of the conveyer said idler wheels are rotatably mounted upon said shaft and the hubs free of said fingers and whereby when it is necessary to insert or remove the endless cutting blades said shaft is withdrawn from said wheels at which time the hubs of said wheels are supported by said fingers and further characterized by the fact that said slots are positioned between said chains.

3. In a bread slicing machine, a table having blade receiving slots, endless cutting blades mounted to operate vertically through said slots, driven sprockets rotatably mounted at one end of said table, idler wheels mounted for rotation at the opposite end of said table, conveyer chains trained over said sprockets and wheels, respectively, removable means for normally supporting said idler wheels, and supporting fingers carried by said table to support said idler wheels during insertion of said endless cutting blades within said blade receiving slots in said table or removal therefrom substantially as described.

4. In a bread slicing machine, a table having blade receiving slots of graduated lateral depths, endless cutting blades of graduated lengths mounted to operate vertically through said slots, driven sprockets rotatably mounted at one end of said table, idler wheels rotatably mounted at the other end of said table, endless conveyer chains trained over said sprockets and idler wheels, a removable shaft carried by said table and adapted to normally support said idler wheels, and auxiliary means carried by said table and adapted to support said idler wheels when said shaft is removed for insertion of said endless cutting blades within said blade receiving slots in said table or removed therefrom substantially as described and for the purposes specified.

5. In a bread slicing machine, a table having blade receiving slots cut therein, endless bread cutting blades mounted to operate vertically through said slots and towards said table, driven sprockets rotatably mounted at the outfeed end of said table, idler wheels rotatably mounted at the infeed end of said table, bread conveyer chains trained over said sprockets and wheels, respectively, a removable shaft carried by said table and adapted to normally support said idler wheels, and auxiliary means comprising supporting fingers to support said idler wheels when said shaft is removed to insert said endless blades within said blade receiving slots or to remove them therefrom characterized by the fact that the upper stretch of each conveyer chain is moved in a direction from said idler wheels, guided across said table and towards said sprockets to thereby feed unsliced loaves of bread towards, into and past the endless cutting blades substantially as described.

RAYMOND W. EGAN.
CHARLES H. PETSKEYES.